United States Patent
Kailash et al.

(10) Patent No.: US 7,924,884 B2
(45) Date of Patent: Apr. 12, 2011

(54) PERFORMANCE LOGGING USING RELATIVE DIFFERENTIALS AND SKIP RECORDING

(75) Inventors: Kailash Kailash, San Jose, CA (US); Saravanakumar Annamalaisami, Santa Clara, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 972 days.

(21) Appl. No.: 11/312,816

(22) Filed: Dec. 20, 2005

(65) Prior Publication Data

US 2007/0140301 A1     Jun. 21, 2007

(51) Int. Cl.
*H04J 3/00*     (2006.01)

(52) U.S. Cl. .................. 370/498; 370/395.72; 370/412; 379/32.01; 709/224; 702/187

(58) Field of Classification Search .................. 370/252, 370/253, 401–402, 473, 509, 395.72, 412; 702/187; 714/746; 707/104.1, 3, 201; 709/220, 709/224, 202, 219; 379/32.01
See application file for complete search history.

(56) References Cited

U.S. PATENT DOCUMENTS

| | | | |
|---|---|---|---|
| 4,138,719 A | 2/1979 | Swanstrom et al. | |
| 4,928,247 A | 5/1990 | Doyle et al. | |
| 4,949,248 A | 8/1990 | Caro | |
| 5,317,732 A | 5/1994 | Gerlach, Jr. et al. | |
| 5,426,637 A | 6/1995 | Derby et al. | |
| 5,432,932 A | 7/1995 | Chen et al. | |
| 5,572,528 A | 11/1996 | Shuen | |
| 5,632,002 A | 5/1997 | Hashimoto et al. | |
| 5,633,868 A | 5/1997 | Baldwin et al. | |
| 5,638,513 A | 6/1997 | Ananda | |
| 5,652,909 A | 7/1997 | Kodosky | |
| 5,742,797 A | 4/1998 | Celi, Jr. et al. | |
| 5,748,499 A * | 5/1998 | Trueblood | 702/187 |
| 5,754,774 A | 5/1998 | Bittinger et al. | |
| 5,764,915 A | 6/1998 | Heimsoth et al. | |
| 5,768,528 A | 6/1998 | Stumm | |
| 5,802,281 A | 9/1998 | Clapp et al. | |
| 5,809,235 A | 9/1998 | Sharma et al. | |
| 5,852,717 A | 12/1998 | Bhide et al. | |
| 5,859,971 A | 1/1999 | Bittinger et al. | |
| 5,867,494 A | 2/1999 | Krishnaswamy et al. | |

(Continued)

FOREIGN PATENT DOCUMENTS

WO     WO-0051290 A2     8/2000

(Continued)

*Primary Examiner* — Aung S Moe
*Assistant Examiner* — Vinncelas Louis
(74) *Attorney, Agent, or Firm* — Christopher McKenna

(57) ABSTRACT

The present invention is directed towards "skip" and "differential" recording techniques for recording values of network parameter to a log in a lossless manner while reducing storage resources used to record such values. The counter monitor of the present invention monitors and records values of counters at time intervals to generate a counter log provided via temporary or permanent storage. The counter monitor compares a reading of the value of the counter to a previously obtained value of the counter. If the value of the counter has not changed, the counter monitor records only the timestamp to the counter log, thereby "skipping" the recording of the unchanged value. If there is any change in the value of the counter, then the change in value of the counter, i.e., a "differential" value, along with the timestamp is stored in the counters log. To further reduce storage resource usage, the counter monitor also stores changes to the timestamps as differential changes in time values.

33 Claims, 6 Drawing Sheets

U.S. PATENT DOCUMENTS

| | | | |
|---|---|---|---|
| 5,881,229 | A | 3/1999 | Singh et al. |
| 5,907,704 | A | 5/1999 | Gudmundson et al. |
| 5,909,559 | A | 6/1999 | So |
| 5,918,213 | A | 6/1999 | Bernard et al. |
| 5,920,697 | A | 7/1999 | Masters et al. |
| 5,938,733 | A | 8/1999 | Heimsoth et al. |
| 5,983,190 | A | 11/1999 | Trower, II et al. |
| 5,999,179 | A | 12/1999 | Kekic et al. |
| 5,999,525 | A | 12/1999 | Krishnaswamy et al. |
| 6,038,601 | A | 3/2000 | Lambert et al. |
| 6,061,714 | A | 5/2000 | Housel, III et al. |
| 6,073,192 | A | 6/2000 | Clapp et al. |
| 6,084,598 | A | 7/2000 | Chekerylla |
| 6,101,531 | A | 8/2000 | Eggleston et al. |
| 6,105,067 | A | 8/2000 | Batra |
| 6,108,662 | A | 8/2000 | Hoskins et al. |
| 6,112,085 | A | 8/2000 | Garner et al. |
| 6,112,246 | A | 8/2000 | Horbal et al. |
| 6,118,521 | A | 9/2000 | Jung et al. |
| 6,157,864 | A | 12/2000 | Schwenke et al. |
| 6,158,007 | A | 12/2000 | Moreh et al. |
| 6,161,051 | A | 12/2000 | Hafemann et al. |
| 6,167,406 | A | 12/2000 | Hoskins et al. |
| 6,202,096 | B1 | 3/2001 | Williams et al. |
| 6,246,471 | B1 | 6/2001 | Jung et al. |
| 6,246,479 | B1 | 6/2001 | Jung et al. |
| 6,249,348 | B1 | 6/2001 | Jung et al. |
| 6,250,548 | B1 | 6/2001 | McClure et al. |
| 6,256,773 | B1 | 7/2001 | Bowman-Amuah |
| 6,268,853 | B1 | 7/2001 | Hoskins et al. |
| 6,272,148 | B1 | 8/2001 | Takagi et al. |
| 6,272,537 | B1 | 8/2001 | Kekic et al. |
| 6,304,895 | B1 | 10/2001 | Schneider et al. |
| 6,324,647 | B1 | 11/2001 | Bowman-Amuah |
| 6,335,927 | B1 | 1/2002 | Elliott et al. |
| 6,339,595 | B1 | 1/2002 | Rekhter et al. |
| 6,362,888 | B1 | 3/2002 | Jung et al. |
| 6,370,573 | B1 | 4/2002 | Bowman-Amuah |
| 6,373,573 | B1 | 4/2002 | Jung et al. |
| 6,385,766 | B1 | 5/2002 | Doran, Jr. et al. |
| 6,389,505 | B1 | 5/2002 | Emma et al. |
| 6,400,996 | B1 | 6/2002 | Hoffberg et al. |
| 6,405,364 | B1 | 6/2002 | Bowman-Amuah |
| 6,414,750 | B2 | 7/2002 | Jung et al. |
| 6,421,738 | B1 | 7/2002 | Ratan et al. |
| 6,427,234 | B1 | 7/2002 | Chambers et al. |
| 6,449,041 | B1 | 9/2002 | Jung et al. |
| 6,452,915 | B1 | 9/2002 | Jorgensen |
| 6,452,923 | B1 | 9/2002 | Gerszberg et al. |
| 6,453,334 | B1 | 9/2002 | Vinson et al. |
| 6,453,343 | B1 | 9/2002 | Housel, III et al. |
| 6,473,794 | B1 | 10/2002 | Guheen et al. |
| 6,502,135 | B1 | 12/2002 | Munger et al. |
| 6,502,207 | B1 | 12/2002 | Itoh et al. |
| 6,505,174 | B1 | 1/2003 | Keiser et al. |
| 6,505,241 | B2 | 1/2003 | Pitts |
| 6,519,037 | B2 | 2/2003 | Jung et al. |
| 6,519,571 | B1 | 2/2003 | Guheen et al. |
| 6,526,056 | B1 | 2/2003 | Rekhter et al. |
| 6,536,037 | B1 | 3/2003 | Guheen et al. |
| 6,539,418 | B2 | 3/2003 | Schneider et al. |
| 6,546,425 | B1 | 4/2003 | Hanson et al. |
| 6,556,950 | B1 | 4/2003 | Schwenke et al. |
| 6,573,907 | B1 | 6/2003 | Madrane |
| 6,581,824 | B1 | 6/2003 | McClure et al. |
| 6,583,866 | B2 | 6/2003 | Jung et al. |
| 6,587,878 | B1 | 7/2003 | Merriam |
| 6,590,660 | B2 | 7/2003 | Jung et al. |
| 6,615,166 | B1 | 9/2003 | Guheen et al. |
| 6,618,761 | B2 | 9/2003 | Munger et al. |
| 6,629,081 | B1 | 9/2003 | Cornelius et al. |
| 6,640,145 | B2 | 10/2003 | Hoffberg et al. |
| 6,640,248 | B1 | 10/2003 | Jorgensen |
| 6,641,033 | B2 | 11/2003 | McClure et al. |
| 6,643,652 | B2 | 11/2003 | Helgeson et al. |
| 6,643,696 | B2 | 11/2003 | Davis et al. |
| 6,647,399 | B2 * | 11/2003 | Zaremba .................. 707/204 |
| 6,658,000 | B1 | 12/2003 | Raciborski et al. |
| 6,662,357 | B1 | 12/2003 | Bowman-Amuah |
| 6,662,998 | B2 | 12/2003 | McClure et al. |
| 6,664,978 | B1 | 12/2003 | Kekic et al. |
| 6,687,227 | B1 | 2/2004 | Li et al. |
| 6,688,517 | B1 | 2/2004 | McClure et al. |
| 6,691,301 | B2 | 2/2004 | Bowen et al. |
| 6,701,345 | B1 | 3/2004 | Carley et al. |
| 6,701,380 | B2 | 3/2004 | Schneider et al. |
| 6,715,145 | B1 | 3/2004 | Bowman-Amuah |
| 6,721,286 | B1 | 4/2004 | Williams et al. |
| 6,721,713 | B1 | 4/2004 | Guheen et al. |
| 6,721,747 | B2 | 4/2004 | Lipkin |
| 6,731,625 | B1 | 5/2004 | Eastep et al. |
| 6,737,591 | B1 | 5/2004 | Lapstun et al. |
| 6,742,045 | B1 | 5/2004 | Albert et al. |
| 6,754,181 | B1 | 6/2004 | Elliott et al. |
| 6,768,821 | B2 | 7/2004 | Silverbrook et al. |
| 6,775,692 | B1 | 8/2004 | Albert et al. |
| 6,788,315 | B1 | 9/2004 | Kekic et al. |
| 6,797,895 | B2 | 9/2004 | Lapstun et al. |
| 6,802,041 | B1 | 10/2004 | Rehm |
| 6,826,616 | B2 | 11/2004 | Larson et al. |
| 6,834,310 | B2 | 12/2004 | Munger et al. |
| 6,839,759 | B2 | 1/2005 | Larson et al. |
| 6,845,387 | B1 | 1/2005 | Prestas et al. |
| 6,850,252 | B1 | 2/2005 | Hoffberg |
| 6,850,893 | B2 | 2/2005 | Lipkin et al. |
| 6,862,553 | B2 | 3/2005 | Schwenke et al. |
| 6,870,616 | B2 | 3/2005 | Jung et al. |
| 6,870,966 | B1 | 3/2005 | Silverbrook et al. |
| 6,877,043 | B2 | 4/2005 | Mallory et al. |
| 6,882,634 | B2 | 4/2005 | Bagchi et al. |
| 6,888,844 | B2 | 5/2005 | Mallory et al. |
| 6,891,881 | B2 | 5/2005 | Trachewsky et al. |
| 6,898,204 | B2 | 5/2005 | Trachewsky et al. |
| 6,907,473 | B2 | 6/2005 | Schmidt et al. |
| 6,909,708 | B1 | 6/2005 | Krishnaswamy et al. |
| 6,915,955 | B2 | 7/2005 | Jung et al. |
| 6,934,288 | B2 | 8/2005 | Dempo et al. |
| 6,954,800 | B2 | 10/2005 | Mallory |
| 6,957,186 | B1 | 10/2005 | Guheen et al. |
| 6,975,655 | B2 | 12/2005 | Fischer et al. |
| 6,981,047 | B2 | 12/2005 | Hanson et al. |
| 6,988,236 | B2 | 1/2006 | Ptasinski et al. |
| 6,993,101 | B2 | 1/2006 | Trachewsky et al. |
| 6,993,456 | B2 | 1/2006 | Brooks et al. |
| 7,000,031 | B2 | 2/2006 | Fischer et al. |
| 7,003,777 | B2 | 2/2006 | Hines |
| 7,006,881 | B1 | 2/2006 | Hoffberg et al. |
| 7,006,991 | B2 | 2/2006 | Keiser et al. |
| 7,030,890 | B1 | 4/2006 | Jouet et al. |
| 7,035,285 | B2 | 4/2006 | Holloway et al. |
| 7,041,916 | B2 | 5/2006 | Paul et al. |
| 7,065,500 | B2 | 6/2006 | Singh et al. |
| 7,069,186 | B2 | 6/2006 | Jung et al. |
| 7,069,234 | B1 | 6/2006 | Cornelius et al. |
| 7,072,934 | B2 | 7/2006 | Helgeson et al. |
| 7,089,583 | B2 | 8/2006 | Mehra et al. |
| 7,105,753 | B1 | 9/2006 | Lapstun et al. |
| 7,113,934 | B2 | 9/2006 | Levesque et al. |
| 7,116,894 | B1 | 10/2006 | Chatterton |
| 7,117,504 | B2 | 10/2006 | Smith et al. |
| 7,127,525 | B2 | 10/2006 | Coleman et al. |
| 7,132,612 | B2 | 11/2006 | Lapstun et al. |
| 7,136,645 | B2 | 11/2006 | Hanson et al. |
| 7,139,999 | B2 | 11/2006 | Bowman-Amuah |
| 7,145,898 | B1 | 12/2006 | Elliott |
| 7,149,698 | B2 | 12/2006 | Guheen et al. |
| 7,165,041 | B1 | 1/2007 | Guheen et al. |
| 7,167,844 | B1 | 1/2007 | Leong et al. |
| 7,185,075 | B1 | 2/2007 | Mishra et al. |
| 7,187,370 | B2 | 3/2007 | Lapstun et al. |
| 7,188,180 | B2 | 3/2007 | Larson et al. |
| 7,197,234 | B1 | 3/2007 | Chatterton |
| 7,225,244 | B2 | 5/2007 | Reynolds et al. |
| 7,272,216 | B2 * | 9/2007 | Elias et al. .................. 379/111 |
| 7,404,003 | B1 | 7/2008 | Noble |
| 7,490,166 | B2 | 2/2009 | Yang et al. |
| 7,502,447 | B2 * | 3/2009 | McCormick et al. ...... 379/32.01 |

| | | |
|---|---|---|
| 7,558,786 B2 * | 7/2009 | Robson et al. .................... 707/3 |
| 2002/0035596 A1 | 3/2002 | Yang et al. |
| 2002/0049788 A1 | 4/2002 | Lipkin et al. |
| 2002/0098840 A1 | 7/2002 | Hanson et al. |
| 2002/0138511 A1 | 9/2002 | Psounis et al. |
| 2002/0138643 A1 | 9/2002 | Shin et al. |
| 2003/0023746 A1 | 1/2003 | Loguinov |
| 2003/0055883 A1 | 3/2003 | Wiles |
| 2003/0056112 A1 | 3/2003 | Vinson et al. |
| 2003/0120811 A1 | 6/2003 | Hanson et al. |
| 2003/0135612 A1 * | 7/2003 | Huntington et al. .......... 709/224 |
| 2003/0135656 A1 | 7/2003 | Schneider et al. |
| 2003/0149685 A1 | 8/2003 | Trossman et al. |
| 2003/0185238 A1 * | 10/2003 | Strasser et al. ................ 370/473 |
| 2003/0206554 A1 | 11/2003 | Dillon |
| 2004/0003087 A1 | 1/2004 | Chambliss et al. |
| 2004/0008693 A1 | 1/2004 | Grove et al. |
| 2004/0015537 A1 | 1/2004 | Doerksen et al. |
| 2004/0031058 A1 | 2/2004 | Reisman |
| 2004/0073707 A1 | 4/2004 | Dillon |
| 2004/0103194 A1 | 5/2004 | Islam et al. |
| 2004/0193953 A1 * | 9/2004 | Callahan et al. ................ 714/15 |
| 2004/0250124 A1 | 12/2004 | Chesla et al. |
| 2004/0268357 A1 | 12/2004 | Joy et al. |
| 2004/0268358 A1 | 12/2004 | Darling et al. |
| 2005/0013280 A1 | 1/2005 | Buddhikot et al. |
| 2005/0154699 A1 | 7/2005 | Lipkin et al. |
| 2005/0223114 A1 | 10/2005 | Hanson et al. |
| 2005/0223115 A1 | 10/2005 | Hanson et al. |
| 2006/0041635 A1 | 2/2006 | Alexander et al. |
| 2006/0069926 A1 | 3/2006 | Ginter et al. |
| 2006/0085543 A1 | 4/2006 | Hrastar et al. |
| 2006/0221990 A1 | 10/2006 | Muller et al. |
| 2007/0169179 A1 | 7/2007 | Narad |
| 2007/0179955 A1 | 8/2007 | Croft et al. |
| 2007/0245409 A1 | 10/2007 | Harris et al. |
| 2008/0049786 A1 | 2/2008 | Ram et al. |
| 2008/0288543 A1 * | 11/2008 | Barnett ...................... 707/104.1 |
| 2008/0320151 A1 | 12/2008 | McCanne et al. |

FOREIGN PATENT DOCUMENTS

| | | |
|---|---|---|
| WO | WO-02/23362 A1 | 3/2002 |
| WO | WO-2006/074072 | 7/2006 |
| WO | WO-2008/112691 A2 | 9/2008 |

* cited by examiner

PERFORMANCE LOGGING USING RELATIVE DIFFERENTIALS AND SKIP RECORDING

TECHNICAL FIELD

The present invention generally relates to network monitoring. More particularly, the present invention relates to systems and methods for logging of monitored network parameters.

BACKGROUND

As computing devices continue to increase their capacity for processing huge amounts of data, the efficient and fast administration and monitoring of such data becomes ever more challenging. As computers are designed to handle exponentially greater amounts of information, the ability to be able to quickly and efficiently collect data regarding the operation of that computer becomes more and more difficult. The problem is found throughout the world of computers and presents many challenges to administrators charged with monitoring the communication networks that interconnect the millions of networked devices used by millions of people around the world and central to the operations of our modern economy. As the amount of data proliferates, the need for collecting and recording that data becomes more and more difficult and commensurately more and more essential. Recording all this data requires an innovative approach.

Network administrators and others who have responsibility for managing today's communication devices are often overwhelmed at the amount of data collected for measuring and storing network information. The collected data records the state of various measured variables and maintains logs of information that are useful in understanding usage patterns in the network as well as diagnosing the source of problems when a network device defaults during the course of its operation. There is a need for keeping accurate records of all performance data, and any other collected data, produced by a device which requires constant monitoring of such data. Uses of such data are manifold and include those related to diagnosing problems in a device and understanding usage patterns of the device. As the time period of monitoring is extended and the amount of data increases, significant strain is placed on the processor and storage resources for information gathered from the counters. To achieve effective network monitoring, steps need to be taken to ensure that the performance logs of measured network parameters are both accurate and comprehensive without creating excessive burdens on processors and storage devices that process or store such information.

A pure software solution for network monitoring may not be an optimal solution. For a variety of reasons, software implementations have various limitations including the fact that clock inaccuracy will result in the erroneous implementation of the software logic for recording counter information. Also, a pure software solution can put significant strain on the central processing unit (CPU) resources if the software needs to accomplish multiple functions.

Another potential solution for performance logging involves a system of recording all collected data and then performing a compression algorithm on the collected data to shrink it down to a more manageable and storable size. The problem with this data compression-based solution is that compression algorithms themselves typically place a heavy compute burden on the logging infrastructure. Therefore the data compressing solution imposes a significant strains on the processor resources and as a result, problems of efficiency quickly arise as these resources become more and more taxed as the amount of data tracked, and as a result the amount of data compressed, increases.

Another currently used solution for performance logging involves recording only a selected portion of the entire set of data produced by the applicable counters. This is accomplished in a variety of ways including by shutting off the collection of data periodically, or only recording for predetermined amounts of time. The problem with this selective recording solution, like all lossy data solutions, is that not all the data is being recorded, hence the recording log may not have all the information that is necessary for accurately understanding usage of the device or successfully diagnosing the source of an encountered problem. Hence, the data stored may not be sufficiently robust to conduct a comprehensive and accurate performance and diagnostic analysis.

In the case of networking devices, traffic load must be monitored accurately to effectively design and architect traffic management solutions. For example, the bit-rate of the traffic and the timescale over which such a measurement is made determines how much information can be deduced from it. If the time-scale is relatively long with longer intervals, then only the mean traffic load can be deduced and it can be much more difficult to analyze network delays and packet-drop rates which require a more granular approach. Hence, the traffic must be sampled at the rate of packet queuing. Timestamps must typically be set up to record on the order of every tens of milliseconds. However, making such accurate and frequent recording of monitored data poses challenges in terms of software complexity, processor burdens, storage requirements and limitations on hardware resources.

There is a need to provide an efficient mechanism for efficient, lossless logging of collected information and data from networking monitor that will be useful for both diagnostic analysis and performance analysis and that will minimize storage and processing requirements. The stored data should be robust enough for further diagnostic and performance analysis.

There is also a need for a method and means for optimized network monitoring, wherein the benefits of robust capture of data is not correspondingly offset by a significant increase in the resources required for data capture.

SUMMARY OF THE INVENTION

The present invention is directed towards systems and methods along with recording techniques that address the aforementioned needs in network monitoring. The present invention provides a method and apparatus for comprehensively capturing values from counters and minimizing hardware storage resources to achieve such capture. As such, the present invention accomplishes the dual objectives of achieving high performance logging accuracy while minimizing storage requirements.

In one aspect, the present invention is related to method of monitoring network traffic. The method includes a counter monitor obtaining at a first timestamp a first reading of a value of a counter representing information related to network traffic. The counter monitor stores the value of the first reading in association with the first timestamp to a storage unit providing a record of counter values over a time period. The counter monitor obtains at a second timestamp a second reading of the value of the counter, and compares the value of the counter at the second reading to the value of the counter at the first reading. If the value of the counter is unchanged, the counter monitor stores the second timestamp to the storage unit without storing the value of the counter at the second reading. If the value of the counter has changed, the counter monitor stores the second timestamp and a second value representing a difference between the second reading and the first reading to the storage unit. In one embodiment, the method further processes a stored value of the counter in the storage unit, and stores the processed value in the storage unit in association with the counter.

In another embodiment of the present invention, the method includes a user identifying the counter in the network desired to be monitored. In one embodiment, the method also includes assigning a unique numeric identifier to the counter. The value of the counter may include a single value or multiple values. In yet other embodiments, the value of the counter represents one or more of the following parameters: 1) a bit rate, 2) a MAC address, 3) a source address, 4) a destination address, 5) a number of frames transmitted, 6) a number of collisions, 7) traffic delay data, 8) data on packets dropped, 9) data on frames per second, 1) a frequency of occurrence of a particular protocol, 11) an application level statistic and 12) a metric used for network monitoring. In some embodiments, the counter monitor executes or runs in a bridge, a router, a switch, a load-balancer, a server, or a network interface card.

In one embodiment, the method of the present invention stores the second timestamp as a value representing a difference in time between the first timestamp and the second timestamp. In some embodiments, the first timestamp or the second timestamp is provided via a second counter comprising a timer. The method of the present invention may include setting a time interval between the first timestamp and the second timestamp at either an equal or a variable time interval. In some embodiments, the time interval is set based on one or more characteristics of the network traffic. In one embodiment, the time interval is set to a rate of packet queuing in the network.

In another aspect, the present invention is related to an apparatus for recording values of monitored counters. The apparatus has a storage for storing a record of values over a time period for a counter representing information related to network traffic. The apparatus also includes a counter monitor for monitoring a value of the counter. The counter monitor obtains at a first timestamp a first reading of the value of the counter, and at a second timestamp a second reading of the value of the counter. The counter monitor stores the value of the first reading in association with the first timestamp to the storage. The apparatus also includes a comparator for comparing the first reading of the value of the counter to the second reading of the value of the counter. If the value of the counter is unchanged, the apparatus of the present invention stores the second timestamp to the storage unit without storing the value of the counter at the second reading. If the value of the counter has changed, the apparatus stores the second timestamp and a second value representing a difference between the second reading and the first reading to the storage. In some embodiments, the counter monitor comprises a multiplexer. The multiplexer multiplexes the values from multiple counters and sends aggregated values to the comparator. In other embodiments, the counter may be either a sequential counter or a non-sequential counter.

In one embodiment, the apparatus includes a controller for coordinating a timing sequence of timestamps and recording of the values. In another embodiment, the apparatus also includes memory for storing one or more algorithms executed by the controller. In some embodiments, the network may include one of the following: 1) a point to point network, 2) a broadcast network, 3) a wide area network, 4) a local area network, 5) a telecommunications network, 6) a data communication network, 7) a computer network, 8) an ATM network, 9) a SONET network, 10) a SDH network, 11) a wireless network, and 12) a wireline network. In some embodiments, the apparatus is located in one or more of the following locations in the network: 1) a load balancer, 2) a bridge, 3) a router, 4) a switch, 5) a server, or 6) a network interface card. Additionally, the storage may reside external to the apparatus and in either the same or different network as the apparatus.

The counter monitor of the present invention in some embodiments assigns a unique numeric identifier to the counter. The apparatus of the present invention may also include a timer for providing the first timestamp or the second timestamp. The timer may provide an equal or variable time interval between the first timestamp and the second timestamp. In some embodiments, the time interval is set based on one or more characteristics of the network traffic. In one embodiment, the wherein the time interval is set to a rate of packet queuing in the network.

In further embodiments, the counter monitor of the present invention stores the second timestamp as a value representing a difference in time between the first timestamp and the second timestamp. The value of the counter may include a single value or multiple values. The value of the counter may represent one or more of the following parameters: 1) a bit rate, 2) a MAC address, 3) a source address, 4) a destination address, 5) a number of frames transmitted, 6) a number of collisions, 7) traffic delay data, 8) data on packets dropped, 9) data on frames per second, 1) a frequency of occurrence of a particular protocol, 11) an application level statistic and 12) a metric used for network monitoring. Additionally, the counter monitor may include a processing circuit for processing a stored value of the counter in the storage unit.

The details of various embodiments of the invention are set forth in the accompanying drawings and the description below.

BRIEF DESCRIPTION OF THE DRAWINGS

The foregoing and other objects, aspects, features, and advantages of the invention will become more apparent and may be better understood by referring to the following description taken in conjunction with the accompanying drawings, in which.

DETAILED DESCRIPTION OF THE INVENTION

Certain illustrative embodiments of the present invention are described below. It is, however, expressly noted that the present invention is not limited to these embodiments, but rather the intention is that additions and modifications to what is expressly described herein also are included within the scope of the invention. Moreover, it is to be understood that the features of the various embodiments described herein are not mutually exclusive and can exist in various combinations and permutations, even if such combinations or permutations are not expressly made herein, without departing from the spirit and scope of the invention.

The illustrative embodiment of the systems and methods of the present invention provide "skip" and "differential" recording techniques for recording values of counters to a log in a lossless manner while reducing storage resources used to record such values. The counter monitor of the present invention monitors and records values of counters at time intervals to generate a counter log provided via temporary or permanent storage. The counter monitor compares a reading of the value of the counter to a previously obtained reading of the value of the counter. If the value of the counter has not changed, the counter monitor records only the timestamp to the counter log, thereby "skipping" the recording of the unchanged value. If there is any change in the value of the counter, then the change in value of the counter, i.e., a "differential" value, along with the timestamp is stored in the counter log. As such, the illustrative embodiment of the counter monitor of the present invention skips recording unchanged values and only stores the differential value of the counter when the counter changes to reduce storage resources used for the counter log. To further reduce storage resource usage, the counter monitor also stores changes to the timestamps as differential changes in time values between timestamps.

Figure 1A:
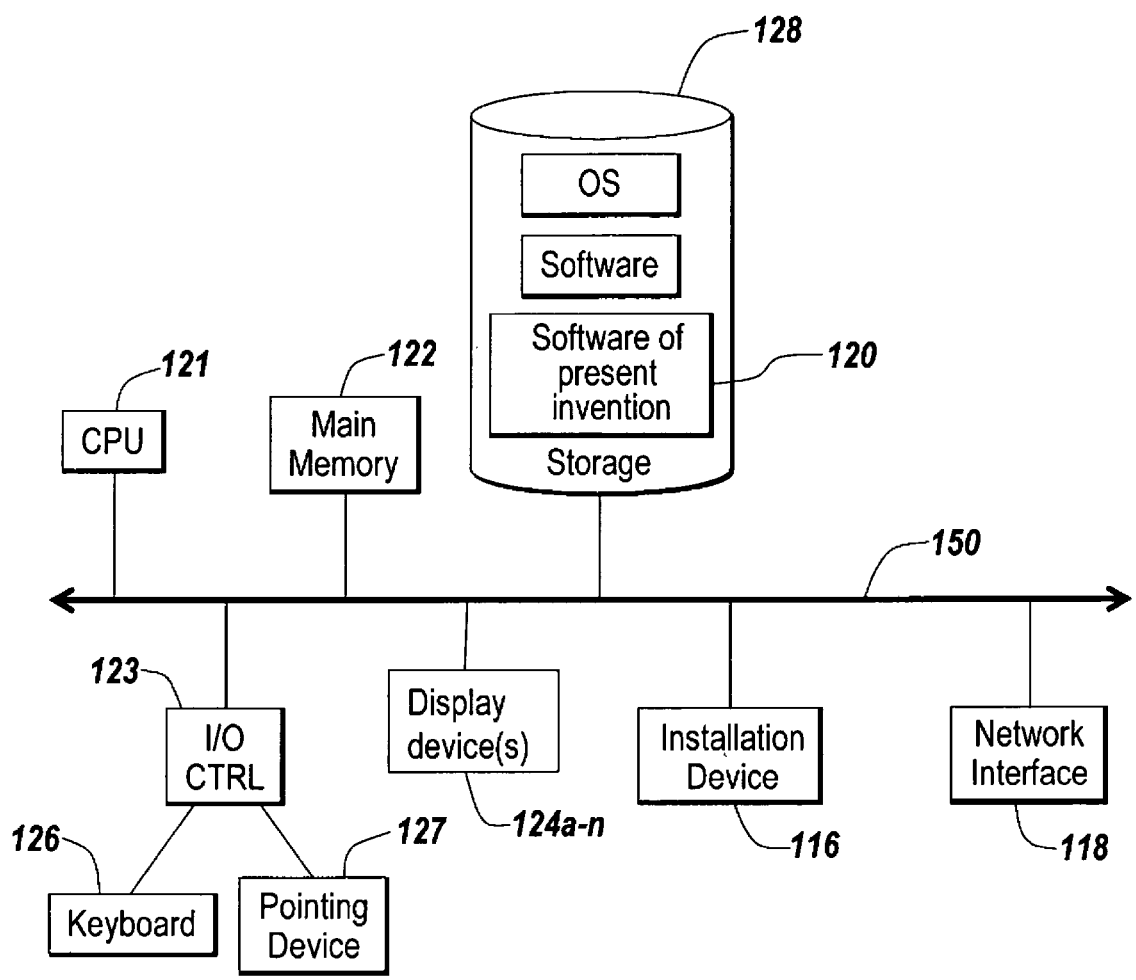
FIGS. 1A and 1B are block diagrams of embodiments of a computing or network device for practicing an illustrative embodiment of the present invention.
Figure 1B:
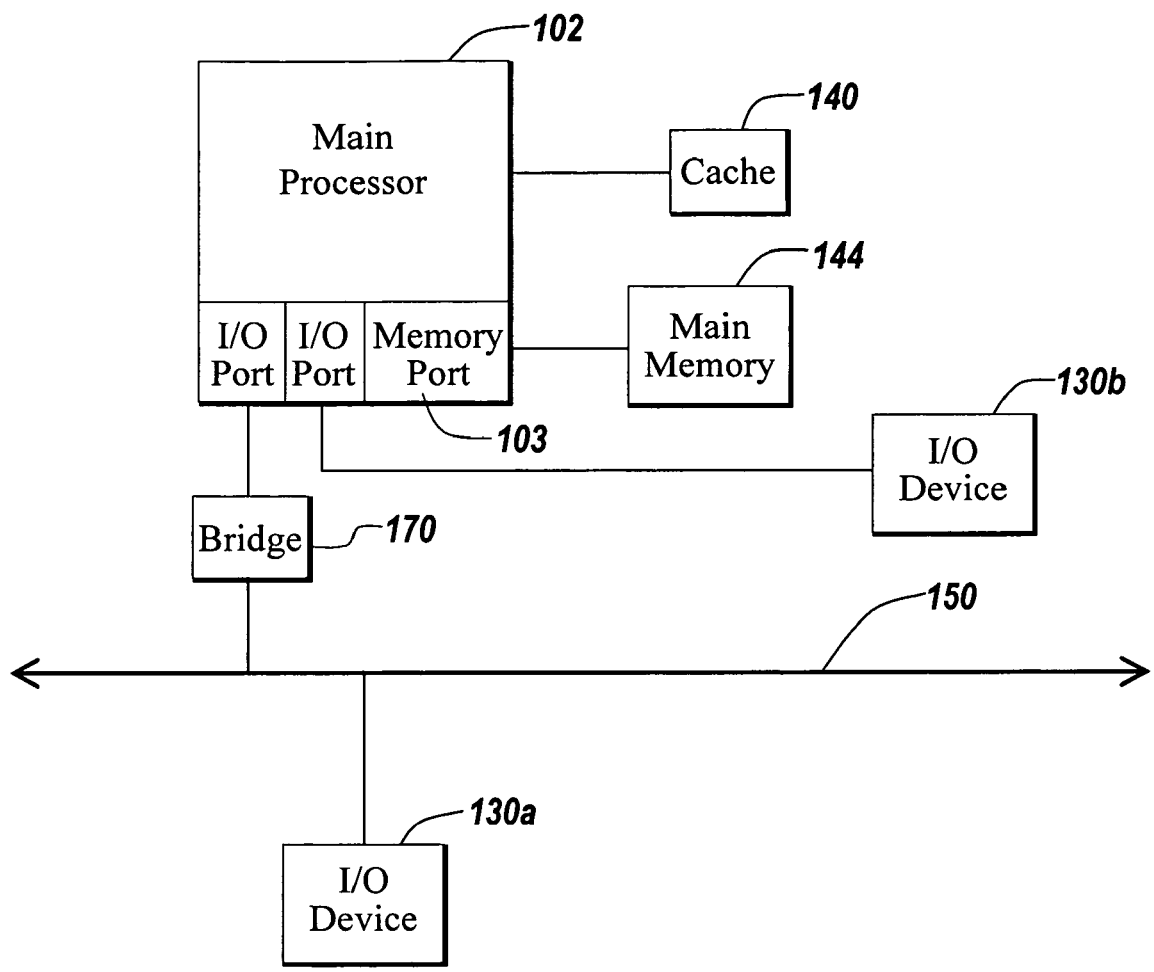

FIGS. 1A and 1B depict block diagrams of a computing device 100, and in some embodiments, also referred to as a network device 100, useful for practicing an embodiment of the present invention. As shown in FIGS. 1A and 1B, each computing device 100 includes a central processing unit 102, and a main memory unit 122. As shown in FIG. 1A, a typical computing device 100 may include a visual display device 124, a keyboard 126 and/or a pointing device 127, such as a mouse. Each computing device 100 may also include additional optional elements, such as one or more input/output devices 130a-130b (generally referred to using reference numeral 130), and a cache memory 140 in communication with the central processing unit 102.

The central processing unit 102 is any logic circuitry that responds to and processes instructions fetched from the main memory unit 122. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 102, such as Static random access memory (SRAM), Burst SRAM or Synch-Burst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1A, the processor 102 communicates with main memory 122 via a system bus 150 (described in more detail below). FIG. 1A depicts an embodiment of a computing device 100 in which the processor communicates directly with main memory 122 via a memory port 103. For example, in FIG. 1B the main memory 122 may be DRDRAM.

FIG. 1B depicts an embodiment in which the main processor 102 communicates directly with cache memory 140 via a secondary bus, sometimes referred to as a backside bus. In other embodiments, the main processor 102 communicates with cache memory 140 using the system bus 150. Cache memory 140 typically has a faster response time than main memory 122 and is typically provided by SRAM, BSRAM, or EDRAM.

In the embodiment shown in FIG. 1A, the processor 102 communicates with various I/O devices 130 via a local system bus 150. Various busses may be used to connect the central processing unit 102 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 102 may use an Advanced Graphics Port (AGP) to communicate with the display 124. FIG. 1B depicts an embodiment of a computer 100 in which the main processor 102 communicates directly with I/O device 130b via HyperTransport, Rapid I/O, or InfiniBand. FIG. 1B also depicts an embodiment in which local busses and direct communication are mixed: the processor 102 communicates with I/O device 130a using a local interconnected bus while communicating with I/O device 130b directly.

The computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs such as any software 120, or portion thereof, related to the present invention. The computing device 100 may further comprise a storage device 128, such as one or more hard disk drives or redundant arrays of independent disks, for storing an operating system and other related software, and for storing application software programs such as any program related to the software 120 of the present invention. Optionally, any of the installation devices 116 could also be used as the storage device 128.

Furthermore, the computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

A wide variety of I/O devices 130a-130n may be present in the computing device 100. Input devices include keyboards, mice, trackpads, trackballs, microphones, and drawing tablets. Output devices include video displays, speakers, inkjet printers, laser printers, and dye-sublimation printers. The I/O devices may be controlled by an I/O controller 123 as shown in FIG. 1A. The I/O controller may control one or more I/O devices such as a keyboard 126 and a pointing device 127, e.g., a mouse or optical pen. Furthermore, an I/O device may also provide storage 128 and/or an installation medium 116 for the computing device 100. In still other embodiments, the computing device 100 may provide USB connections to receive handheld USB storage devices such as the USB Flash Drive line of devices manufactured by Twintech Industry, Inc. of Los Alamitos, Calif.

In further embodiments, an I/O device 130 may be a bridge 170 between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 100 of the sort depicted in FIGS. 1A and 1B typically operate under the control of operating systems, which control scheduling of tasks and access to system resources. The computing device 100 can be running any operating system such as any of the versions of the Microsoft® Windows operating systems, the different releases of the Unix and Linux operating systems, any version of the Mac OS® for Macintosh computers, any embedded operating system, any network operating system, any real-time operating system, any open source operating system, any proprietary operating system, any operating systems for mobile computing devices or network devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, and WINDOWS XP, all of which are manufactured by Microsoft Corporation of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

In other embodiments, the computing device 100 may have different processors, operating systems, and input devices consistent with the device. The computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations of the present invention described herein.

Moreover, the computing device 100 can be any type and/or form of network device, such as a remote access device, a Virtual Private Network (VPN) device, a Secure Socket Layer (SSL) VPN device, router, switch, bridge, or other network device in any form capable of performing the operations of the present invention described herein. In one embodiment, the device 100 is a stand-alone device design and constructed to provide the counter monitor of the present invention. For example, the device 100 may be a network monitoring device that can be plugged into any point or location in a network.

Figure 2:
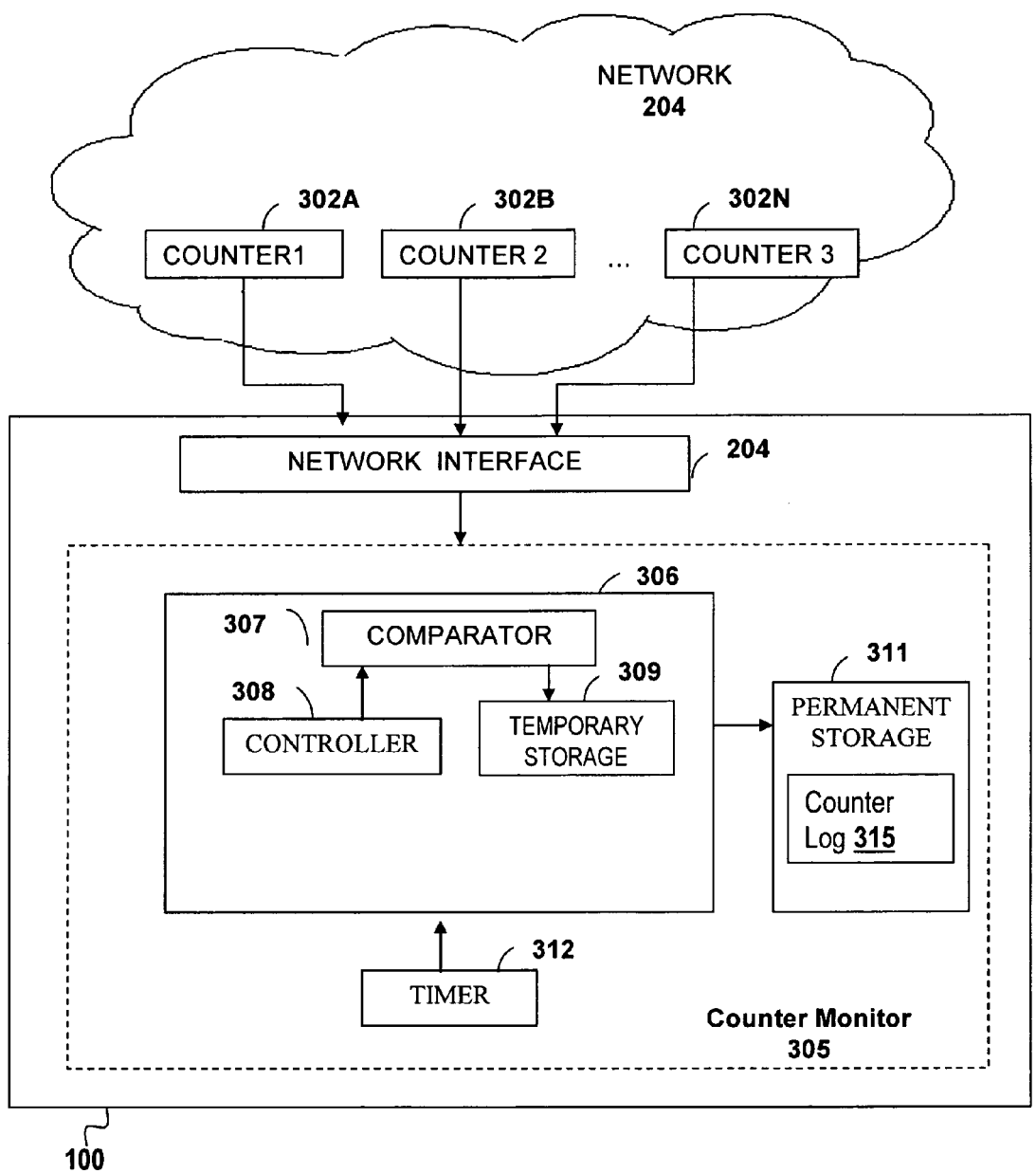
FIG. 2 is a block diagram illustrating the structure of the recording apparatus in an embodiment of the present invention used for recording the values from counters in a network.

In one aspect, the present invention is related to a counter monitor system for recording a counter log using the skip and differential recording techniques of the present invention described herein. FIG. 2 describes an exemplary system 200 used to practice one or more of the techniques of the present invention, such as any of the illustrative methods of FIGS. 4 and 5 described below. In brief overview, the system 200 includes a computing or network device 100 having a counter monitor 305 in communication with a network interface 304 for accessing one or more counters 302a-302n via a network 204. The counter monitor 205 may include a comparator 307, a controller 308, temporary storage 309, a timer 214 and permanent storage 312. In some embodiments, the device 100 may be a server or other type or form of computer on the network 204. In other embodiments, the device 100 may be a network device, such as a bridge, router, or switch, while in yet another embodiment, the device 100 may be a network interface card in the server, computer or network device. In one embodiment, the counter monitor 305 may be included in a stand-alone device 100 that is located at any point in the network.

The device 100 comprises a network interface 304 which provides an interface between the counter monitor 305 and the counters 302A-302N being monitored. For example, in FIG. 2, the network interface 304 interfaces with the counters 302A, 302B and 302N. The network interface 204 may comprise any suitable type and/or form of means and/or mechanisms to interface with and obtain the values of one or more counters 302A-302N in a network 204. In some embodiments, a system, application or device on the network 204 having a counter 302A-302N communicates the values of the counter 302A-302N via network packets communicated to the device 100 of the counter monitor 305. In other embodiments, the counter monitor 305 polls the counters 302A-302N in the network 204 to obtain the values.

In one embodiment, the network 204 could be segmented into sections, with each section separated by a bridge or router. Hence, the location of the counter monitor 305 in one such bridge can cover the monitoring requirements of a section of the network. The bridge, router, load balancer or other such network device 100 will also be in a position to determine the topology of the network, thereby determining the counters that need to be accessed for performance monitoring and diagnostic analysis. In one embodiment, the network interface 304 provides for the aggregation of values from the counters 302A-302N. Optionally, the network interface 304 can also include a multiplexer for providing a multiplexed or aggregated value from multiple counters 302A-302N, and correspondingly, a demultiplexer for separating multiplexed or aggregated values.

Although FIG. 2 shows a network 204 between the counter monitor 305 and the counters 302A-302N, there may be additional networks, e.g., 204', 204" between the counter monitor 305 and the counters 302A-302N. The counter monitor 305 and the counters 302A-302N may be on the same network 204 or on a different network 204'. The networks 204 and 204' can be the same type of network or different types of networks. The network 204 and/or the network 204' can be a local-area network (LAN), such as a company Intranet, a metropolitan area network (MAN), or a wide area network (WAN), such as the Internet or the World Wide Web. The network 204 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network)

network, a SDH (Synchronous Digital Hierarchy) network, a wireless network and a wireline network. The topology of the network 204 and 204' may be a bus, star, or ring network topology. The network 204 and network topology may be of any such network or network topology as know to those ordinarily skilled in the art capable of supporting the operations of the present invention described herein.

The counter monitor 305 can be used to monitor and gather values from counters 302A-302N located in a variety of systems, applications, software, or devices included in a network 204. For example, the counter monitor 305 can be applied to gather values from counters 302A-302N in networks 204 such as point-to-point, broadcast, Wide Area Network (WAN), Local Area Network (LAN), telecommunication or data communication, packet switched or datagram or message switched, Asynchronous Transfer Mode (ATM), wireless, and wire line types of communication networks. The network interface 304 comprises any suitable interface or communication mechanism to monitor and obtain a value of the counter 302A-302N depending on the type and/or form of system, application, software, or device and the type and/or form of network 204 providing the counter 302A-302N.

The counter 302A-302N can be any type and/or form of element having information or data related to network traffic or the monitoring of network traffic. The counter 302A-302N may be provided via software, hardware, or any combination of software and hardware. In some embodiments, the counter 302A-302N comprises an element of a hardware component such as a processor or any type of general purpose processor (GPP), or any other type of integrated circuit, such as a Field Programmable Gate Array (FPGA), Programmable Logic Device (PLD), or Application Specific Integrated Circuit (ASIC). In one embodiment, at least one of the counters 302A-302N may be on the device 100 providing the counter monitor 305. In another embodiment, the counter 302A-302N comprises a storage element in any device 100 on the network 204. For example, the counter 302A-302N may store information in a file or database or in a location of any type of storage device. In another embodiment, the counter 302A-302N comprises a memory element on any device 100 on the network 204. For example, the counter 302A-302N may be stored in a memory element of a network card 118 in any computer 100 on the network 204. In some embodiments, the counter 302A-302N may be in a data structure or object provided by a computer program or application running on a system or device on the network 204.

In other embodiments, the counter 302A-302N or values of the counter 302A-302N may be provided via any type and form of network packet. For example, the counter 302A-302N may comprise any field or portion of the network packet desired to be monitored. Furthermore, the counters 302A-302N can be provided by multiple and/or different systems, applications, or devices. For example, counter 302A may be on the device 100 of the counter monitor 305, while counter 302B may be provided by a bridge or router on the network 204 and counter 302N from a server accessible via the network 204. One ordinarily skilled in the art will recognize and appreciate the various types and forms of elements to provide a counter 302A-302N in practicing the operations of the present invention described herein.

The counter 302A-302N may hold, store or otherwise provide information or data in any type and/or form of representation, such as any one or more numbers, letter, or alphanumeric characters. In one embodiment, the counter 302A-302N may provide a value comprising only digits or numeric data. In another embodiment, the counter 302A-302N may provide a value comprising any combination of letters or symbols to form a character string. In a further embodiment, the value of a counter 302A-302N may be in text or a binary format. In other embodiments, the counter 302A-302N may provide a list of values. In some embodiments, the value or list of values may comprise one or more characters or separators to delimit the values, such as a comma separated list of values. The value of the counter 302A-302N may represent any type and/or form of information, data or parameters related to the device 100, the network 204, or any device 100 on the network, and any operations, functions, or performance thereof related to the network 204. For example, the value of the counter 302A-302N may represent one or more of the following parameters: 1) a bit rate, 2) a Machine Access Control (MAC) address, 3) a source address, 4) a destination address, 5) a number of frames transmitted, 6) a number of collisions, 7) traffic delay data, 8) data on packets dropped, 9) data on frames per second, 10) a frequency of occurrence of a particular protocol, 11) an application level statistic and 12) a metric used for network monitoring.

In some embodiments, the values of the counters 302A-302N may provide information or data related to any remote display, thin-client or presentation layer protocol such as the Independent Computing Architecture (ICA) protocol manufactured by Citrix Systems, Inc. of Ft. Lauderdale, Fla. or the Remote Desktop Protocol (RDP) manufactured by the Microsoft Corporation of Redmond, Wash. In other embodiments, the values of the counters 302A-302N may provide information, data or parameters related to communication of Voice-Over-Internet Protocol (VoIP), such as any real-time data protocols or any voice and/or audio streaming protocols. In further embodiments, the values of the counters 302A-302N provide information, data or parameters related to communication and performance of Hypertext Markup Language (HTML), or the Extensible Markup Language (XML) or any other markup language, or any other application level protocol.

In another embodiment, the values of the counters 302A-302N may comprise information, data or parameters of network traffic and performance of running one or more applications, such as an application providing a thin-client computing or remote display presentation application from a server or server farm. In one embodiment, the server or server farm executes as an application any portion of the Citrix Access Suite™ by Citrix Systems, Inc., such as the MetaFrame or Citrix Presentation Server™, and/or any of the Microsoft® Windows Terminal Services manufactured by the Microsoft Corporation. In one embodiment, the application is an ICA client, developed by Citrix Systems, Inc. of Fort Lauderdale, Fla. In other embodiments, the application includes a Remote Desktop (RDP) client, developed by Microsoft Corporation of Redmond, Wash.

Additionally, the server or server farm may run an application, which, for example, may be an application providing email services such as Microsoft Exchange manufactured by the Microsoft Corporation of Redmond, Wash., a web or Internet server, or a desktop sharing server, or a collaboration server. In some embodiments, any of the applications on the server may comprise any type of hosted service or products, such as GoToMeeting™ provided by Citrix Online Division, Inc. of Santa Barbara, Calif., WebEx™ provided by WebEx, Inc. of Santa Clara, Calif., or Microsoft Office LiveMeeting provided by Microsoft Corporation of Redmond, Wash. One ordinarily skilled in the art will recognize and appreciate the wide variety of types, forms and representation of network related information, data and parameters provided by a counter in practicing the operations of the present invention described herein.

The counter monitor 305 includes a recording unit 306, a permanent storage 311 device and a timer 312. The timer 312 is used to drive the recording unit 306 to obtain, compare and record values of counters 302A-302N at defined time stamps. The timer 312 may comprise software, hardware, or any combination of software and hardware. In one embodiment, the timer 312 comprises a counter 302A-302N. In another embodiment, the timer 312 may comprise any type of integrated circuit or hardware component interfaced with the recording unit 306 to provide a timing signal. The timer 312 may be configured to provide a timing signal or event in any type of granularity suitable for the operations of the present invention described herein. In some embodiments, the timer 312 may provide multiple timing signals or events at different frequencies or time intervals. For example, a first timer 312 may be used for obtaining values for a first counter 302A while a second timer 312 may be used for obtaining values for a second counter 302B. In some embodiments, the recording unit 306 comprises logic, functions, or operations to setup multiple virtual timers from the single timer 312 or to provide a different time interval from the signal of the timer 312, such as by using an offset. In other embodiments, the timer 312 and/or recording unit 306 comprises logic, functions, or operations to provide timestamps for recording at intervals of equal or variable time intervals. One ordinarily skilled in the art will recognize and appreciate how the timer 312 and/or recording unit 306 operates to provide various timestamps at various granularities and variability in performing the operations of the present invention described herein.

The recording unit 306 includes a comparator 307, a temporary storage device 309, and a controller 308. The recording unit 306 provides for the recording of values of counters 302A-302N at recording intervals to provide a log 315, such as a performance log, of the counters 302A-302N in storage such as temporary storage 309 and/or permanent storage 311. A counter log 315 comprises a history or record of values of a counter 302A-302N over a time period at one more time intervals or timestamps. As such, the counter log may include a representation of the value of the counter 302A-302N at one or more recorded timestamps for a time period. A timestamp comprises a record of the time and/or date of entry of data into the log. In some embodiments, the timestamps are provided via a counter 302A-302N. The timestamp may comprise any type and/or form of representation of time and/or date, at any level of granularity, as known to those ordinarily skilled in the art.

The present invention may provide a separate counter log 305 for each counter 302A-302N in some embodiments, while in other embodiments, the counter log 315 may represent a combination, aggregation or a set of multiple counters 302A-302N. Each counter 302A-302N in a counter log 325 may be identified by any type and/or form of unique identifier, such as a numeric identifier assigned to the counter 302A-302N. As will be discussed in further detail below, the counter log 315 generated via the skip and differential recording techniques of the present invention provides a lossless recording of counter values while reducing the storage resources used for the log 315. In one aspect, the recording of counter values is lossless because the time interval or timestamp of recording is less than or equal to the packet processing queue times, or any other processing or network related times such that network packets are not dropped or otherwise counter values lost.

The comparator 307 compares two or more values of a counter 302A-302N to determine if there is a difference between the values. The comparator 307 may comprise software, hardware, or any combination of software and hardware to perform the comparative or differential operations and functions of the present invention described herein. In some embodiments, the comparator 307 comprises any type and/or form of integrated circuit or executable instructions capable of performing a comparison of values and providing an indication or result that the values are the same or different, and, in some embodiments, if the values are different then the difference in values. In another embodiment, the comparator 307 compares a previously stored value of a counter 302A-302N in either the temporary storage 309 or permanent storage 211 with a current value of the counter 302A-302N received through the network interface 304. In one embodiment, the comparator 307 is used by the counter monitor 305 to determine if a value of a counter 302A-302N at one or more of the timestamps can be skipped or not recorded to the counter log because the value of the counter 302A-302N has not changed from the previously recorded value. In some embodiments, the counter monitor 305 uses the comparator 307 to determine and record the difference in values between a value of a counter 302A-302N at a current timestamp and the value of the counter 302A-302N at the previous timestamp.

The recording unit 306 includes a temporary storage 309 and permanent storage 311 for storing values accessed from the counters 302A-302N, differences in values of counters 302A-302N and/or timestamps of obtaining, reading, processing or recording the values of the counters 302A-302N. The temporary storage 309 and permanent storage 311 may comprise any type and/or form of storage element or device, such as any of the storage devices 128 provided by a computing device 100 described above in connection with FIG. 1A. In one embodiment, the temporary storage 309 may include any type and/or form of memory. The temporary or permanent storage devices 309, 311 may comprise semiconductor devices with multiple addressable locations. In some embodiments, the storage devices 309, 311 are random access memory (RAM) units but in other embodiment, the storage devices 309, 311 can also be static random access memory (SRAM) units. In one embodiment, the permanent storage 311 is a semiconductor device or in tape, disk, flash or other type of memory device.

The temporary storage 309 and permanent storage 311 devices include multiple individual storage blocks, areas, cells or locations for storing values of counters 302A-302N, or values of counters 302A-302N and timestamps to form counter logs 315. A counter 302A-302N or portion of temporary or permanent storage 309, 311 associated with a counter 302A-302N may be identified by a counter identifier, such as a unique number assigned to the counter 302A-302N, for example, "counter 1" is counter 302A and "counter 2" is counter 302B as illustrated in FIG. 2. The temporary storage 309 and permanent storage 311 may be segmented, arranged or otherwise organized to provide values of counters 302A-302N or one more counter logs 315 for different sections or segments of the network 204. Each section of the network 204 that is being monitored via the counters 302A-302N may have differing data or network characteristics, for example the sections or segments of the network 204 could differ by the class of service. Different classes of service may have different allowable data rates. As such, a counter log 315 for a first counter 302A associated with a first class of service may record values of the counter 302A at one granularity of timestamp or time interval while a counter log 315' for a second counter 302B associated with a second class of service may record values of the counter 302B at a different level of timestamp granularity. In some embodiments, the timing intervals of the timestamps may be set to less than or equal to any packet queuing rate of the device 100 of the counter monitor 305 in order to not to lose or miss recording any counter values received via the network interface 304.

Although the counter monitor 305 is shown with a temporary 309 and a permanent storage 311, the counter monitor 305, in some embodiments, may also comprise only a temporary storage 309 or only a permanent storage 311. In other embodiments, the counter monitor 305 uses the temporary storage 309 to hold, compare, or process counter values and/or timestamps or otherwise provide the counter log 315, and upon an event or at a particular time, store the counter values and/or timestamps, or otherwise the counter log 315 to the permanent storage 311. In one embodiment, the counter monitor 305 stores counter values and/or the counter log 315 to permanent storage 31 prior to or at the next timestamp. In another embodiment, the counter monitor 305 stores counter values and/or the counter log 315 to permanent storage 311 upon obtaining and comparing the next reading of the value of the counter 302A-302N. In some embodiments, an application, hardware component or set of instructions running in the counter module 315 moves portions of the counter log 315 from temporary storage 309 to permanent storage 311 at predetermined times, for example, every 10 timestamps or every minute.

In one embodiment of the present invention, the permanent storage 311 of the values or processed values collected from the counters 302A-302B, or otherwise the counter log 315 are stored in the counter monitor 305. In another embodiment of the present invention, the values or processed values collected from the counters 302A-302B, or otherwise the counter log 315 are stored in a permanent storage 311 that is external to the counter monitor 305. For example, the permanent storage 311 may be accessible by the device 100 of the counter monitor 305 but located in a different network 204. In one embodiment, the permanent storage 311 of the counter log 315 is located in a server 100 on the network 204. In some embodiments, the value or processed values of the counters 302A-302B are transmitted from the temporary storage 309 to the permanent storage 311 only when the values or processed values in the temporary storage 309 have changed. In other embodiments, another device on the network 204 obtains the values of the counters 302A-302N from the temporary storage 309 and stores them in the permanent storage 311 remote from the counter monitor 305. For example, a network monitoring application on the network 204 may obtain the counter log 315, or any portions thereof, from the counter monitor 305 to provide historical or real-time analysis of network traffic or performance of the network 204.

The counter monitor 305 also includes a controller 308 to sequence and coordinate the activities and processes of all the components of the recording device 306. The controller 308 may comprise software, hardware, or any combination of software and hardware. In one embodiment, the controller 308 comprises an integrated circuit designed and constructed to manage, coordinate, and control the desired activities of the recording unit 306 in performing the operations of the present invention described herein. The controller 308 may be programmable or otherwise configurable to change the management, coordination and control of the recording unit 306 without replacing or changing the controller 308 itself. In some embodiments, the controller 308 may load, read, or otherwise use any form of program, executable instructions, directives, or commands, such as any type of programmable algorithms providing any of the techniques of the present invention as described below in connection with FIGS. 4 and 5. For example, programmable algorithms used for implementing the skip recording method illustrated in FIG. 4 can be stored in Read Only Memory or the operating system of the device 100.

Figure 3:
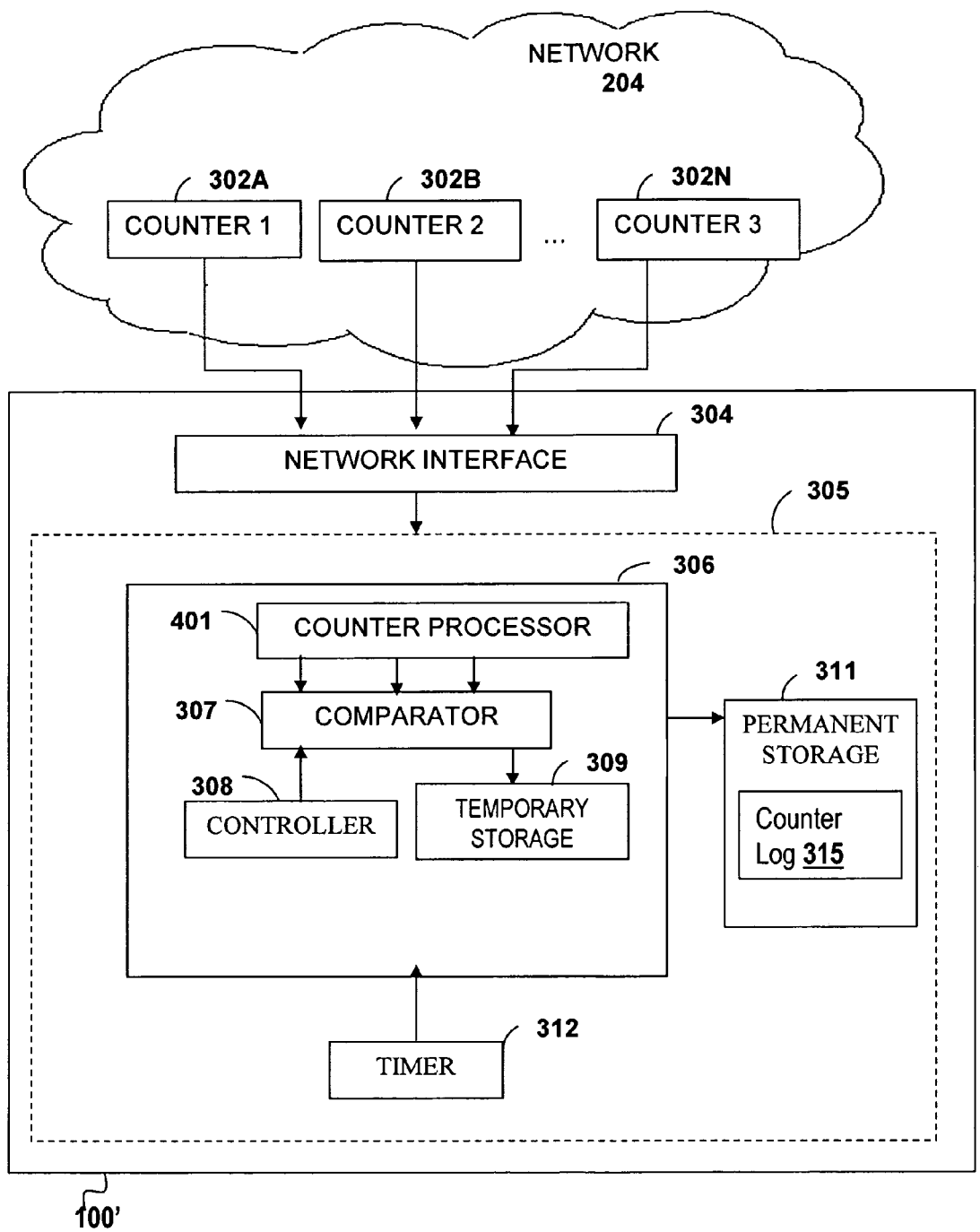
FIG. 3 is a block diagram illustrating the structure of a recording apparatus having an additional processing circuit in another embodiment of the present invention used for recording the values from counters in a network.

Now referring to FIG. 3, another embodiment of the present invention is illustrated. In the illustrative system 300 of FIG. 3, the counter monitor 305 also includes a counter processor 401 for processing the values collected from the counters 302A-302N. The counter processor 401 may comprise software, hardware, or any combination of software and hardware. In one embodiment, the counter processor 401 comprises an integrated circuit referred to as processing circuitry. In other embodiments, the counter processor 401 may comprise a set of executable instructions executing on a processor 102 of the device 100 or on the controller 208. In one embodiment, the counter processor 401 may comprise a program or application running on the counter monitor 305, the device 100 of the counter monitor 305, or another device 100' on the network 204. The counter processor 401 may perform any pre-processing or post-processing of values of counters 302A-302N received by the network interface 204 or stored in temporary storage 309 and/or permanent storage 311. In one embodiment, the counter processor 401 processes the counter values before storing the values in the temporary storage 309. In the case of this embodiment, instead of storing the original values of the counters 302A-203N, the processed values may be stored. For example, the counter processor 401 can include a packet processing circuitry that extracts and processes extracted data from networks packets having a payload holding the values of counters 302A-302N. In other embodiments, the counter processor 401 processes the counter values after the values are stored to a storage 309, 311.

The counter processor 401 may perform any type of processing on the values. In one embodiment, the counter processor 401 performs aggregation or combination of multiple counter values 302A-302N. In another embodiment, the counter processor 401 performs encryption of the values of the counter 302A-302N using any suitable encryption technique or algorithm. In some embodiments, the counter processor 401 performs a compression on the values of the counter 302A-302N using any suitable compression technique or algorithm. In one embodiment, the counter processor 401 calculates a hash on the values of the counter 302A-302N using any suitable hash calculation technique or algorithm. In an additional embodiment, the counter processor 401 calculates a delta encoding on the values of the counter 302A-302N using any suitable delta encoding technique or algorithm. In yet other embodiments, the counter processor 401 performs any metric or statistical calculation on the values of the counters 302A-302N. In further embodiments, the counter processor 401 translates, converts or transforms a value of a counter 302A-302N to another type, format or representation of data, such as normalizing the data values to the same scale or units of measure.

Although the counter monitor 305 is generally illustrated in FIGS. 2 and 3 as a stand-alone device 100 in the network 204, the counter monitor 305 may be included in any computing or network device 100. Additionally, the counter monitor 305 may be included in any portion of software, application, or system that is able to access counters 302A-302N on the network 204 or on a network interface card 118 of a device 100. In one embodiment, the counter monitor 305, or any portion thereof, is part of a network driver executing in any layer of the network protocol stack, such as layer 2, layer 3 or layer 4 of a TCP/IP stack. In another example, the counter monitor 305, or portion thereof, comprises a Network Device Interface Specification (NDIS) layer network driver, and in another embodiment, a transport or transport interface driver.

In one example, the counter monitor 305 may provide monitoring of counters 305A-305N related to network access provided via an SSL VPN device 100 or an application acceleration device 100.

In some embodiments, the counter monitor 305 is part of a gateway server 100 or gateway device 100 providing access to a server or server farm, such as a gateway provided by any version of the Citrix Application Gateway server or Citrix Access Gateway device manufactured by Citrix Systems, Inc. of Ft. Lauderdale, Fla. In other embodiments, the counter monitor 305 is included in one or more servers, such as any of the server in a server farm. In one embodiment, the counter monitor 305 monitors and records counters 302A-302N related to a server or server farm executing any portion of the Citrix Access Suite™ by Citrix Systems, Inc., such as the MetaFrame or Citrix Presentation Server™, and/or any of the Microsoft® Windows Terminal Services manufactured by the Microsoft Corporation. In one embodiment, the counter monitor 305 may be executed on a client computing device 100 accessing the server or server farm. For example the counter monitor 305 may execute as part of or in conjunction with the ICA client, developed by Citrix Systems, Inc. of Fort Lauderdale, Fla., or the Remote Desktop (RDP) client, developed by Microsoft Corporation of Redmond, Wash. As such, the counter monitor 305 may monitor and record counters 302A-302N related to the client's access to the server or server farm.

Figure 4:
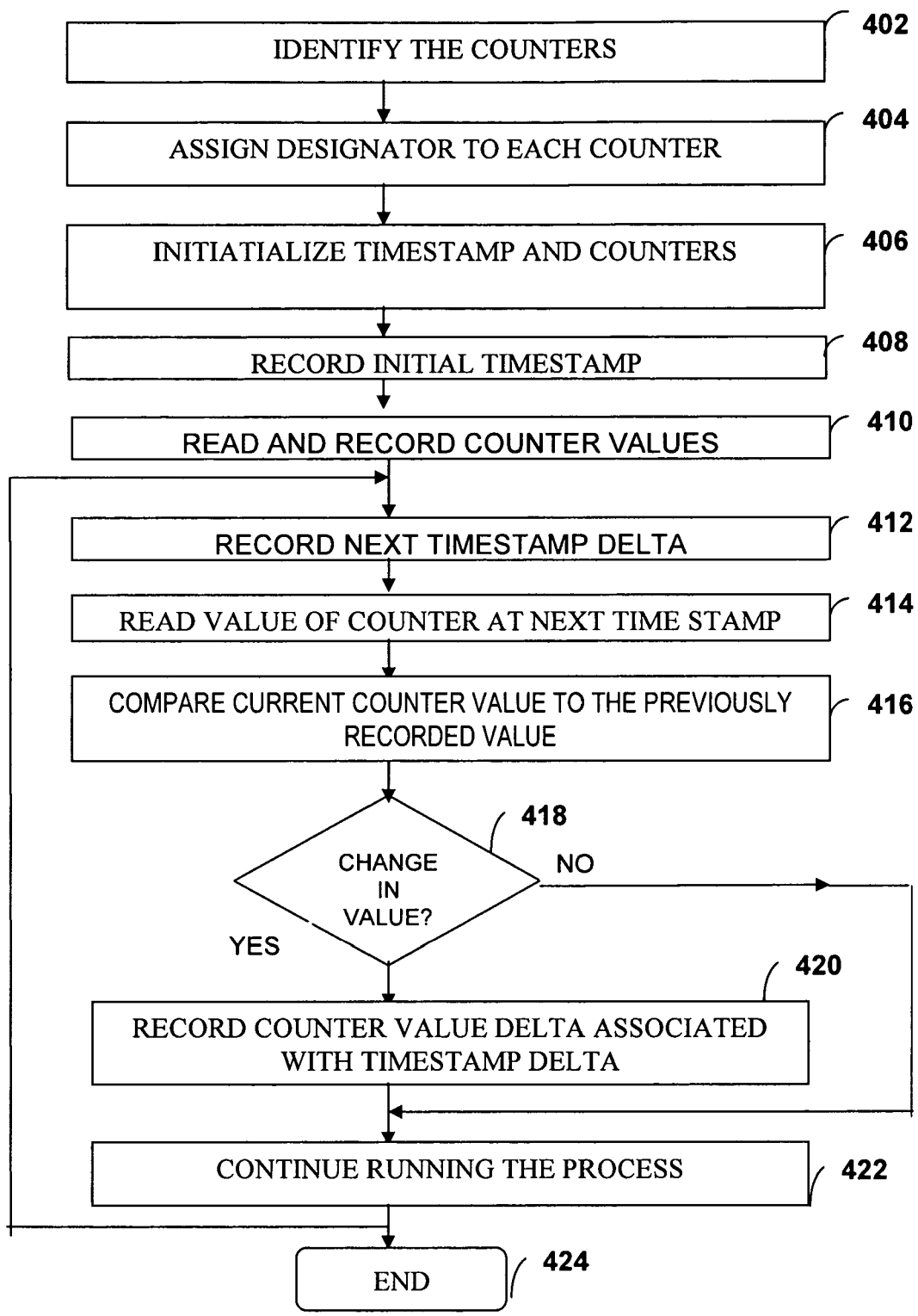
FIG. 4 depicts steps taken in one embodiment of a method for recording values from counters in a network using a skip and differential recording technique.

In another aspect, the present invention is related to the skip and differential recording techniques for providing a counter log 315. FIG. 4 illustrates a method 400 of "skip recording" and "differential recording" that enables comprehensive capture of information from counters 302A-302N, as well as enabling the reduction of the storage of information. In brief overview of illustrative method 400, the counters 302A-302N desired be monitored are identified at step 402, and at step 404, a unique designator is assigned to each of the identified counters 302A-302N. At step 306, the timestamp and counters are initialized. The frequency of accessing information from the counters 302A-302N, that is, the time stamps at which the counters 302A-302N are accessed are defined. In one embodiment, the initial values of all the counters 302A-302N are set to an initial value, such as zero. At step 408, the first timestamp is recorded, and at step 410, the first reading of values of the counters 302A-302N are accessed and recorded. During the next time interval or timestamp for a reading, the timestamp delta is recorded for the counter 302A-302N at step 412. The reading of the value of the counter 302A-302N at the next timestamp at step 411 is compared at step 416 with the previously stored value for that counter 302A-302N. If the value in the counter 302A-302N is different from the previously recorded value as decided at step 418, then the change or differential in value of the counter 302A-302N is recorded for that counter 302A-302N at that timestamp at step 410. If there is no change in the value of the counter 302A-302N at step 418, then the storing of the value of the counter 302A-302N is skipped. Steps 412 through 420 are repeated at subsequent pre-defined timestamps of equal or variable time variables until terminated at step 424 at any point in time, such as at the expiration or completion of the desired network monitoring time period.

In further detail, at step 402 of illustrative method 400, the counters 302A-302N desired to be monitored can be selected or identified by any suitable means and/or mechanisms. In one embodiment, the counter monitor 305 provides a user interface, such as a graphical user interface or a command line interface, for a user to select one or more counters 302A-302N to be monitored from a list of one or more counters 302A-302N configured in the counter monitor 305. In another embodiment, the controller 308, counter processor 401 or network interface 304 is configured dynamically or otherwise to define the counters 302A-302N to be monitored. For example, the controller 308 may load or otherwise use algorithms or executable instructions stored in memory or the operating system having the counters 302A-302N identified for monitoring. In some embodiments, the counter monitor 305 communicates a broadcast message on the network 204 to determine any counters 302A-302N available to be monitored. In these embodiments, a device, system or application on the network 204 having one or more counters 302A-302N may respond with a communication identifying the counters 302A-302B by name, number, uniform resource locator or other suitable identifier.

At step 404, a designator or identifier is assigned for each counter 302A-302N identified to be monitored at step 402. In some embodiments, a designator is assigned to a group of counters 302A-302N. In one embodiment, the designator is numeric, while, in other embodiments, the designator is any type and/or form of characters used for uniquely identifying a counter 302A-302N. In one embodiment, the designator is an ordered numbering scheme for assigning unique numbers to counters 302A-302N. In other embodiments, the counter designator or identifier identifies a portion of storage 309, 311 for storing values of counters 302A-302N and associated timestamps for a counter 302A-302N. For example, the counter designator may also represent a starting address or storage location in a block of memory or storage for the counter 302A-302N. In some embodiments, the counter designator is used for associating a value of the counter 302A-302N with a timestamp in storage 309, 311. In other embodiments, the counter designator is used as a key, such as a record or database key, for identifying any records in storage 309, 311 that form a counter log 315 for the counter 302A-302N.

At illustrative step 406, the timestamp intervals and identified counters are initialized. In some embodiments, the setting of the timestamp intervals depends on the nature of the network 204 being monitored. In many cases, the bandwidth, data rate or speed of the network 204 determines the timestamp increment. For a busier network 204, the timestamps may be shorter; and conversely, for a quieter system, the timestamps can often be set for longer intervals. For example in a computer network application, the timestamp may be dependent on the power of the central processing unit (CPU). Less powerful CPU's can afford larger time stamps. The time stamps can be altered to suit the monitoring requirements of the network 204. In some cases, the timestamps for a counter 302A-302N are set at equal time intervals or variable time intervals. In further cases, the timestamps for each counter 302A-302N are set differently from other counters 302A-302N.

Furthermore, at step 406 of illustrative method 400, the values of counters 302A-302N identified for monitoring may be set to an initial value. The initial values of the identified counters 302A-302N stored in storage 309, 311 forming the counter log 315 may be set to any suitable value. In one embodiment, the initial value is zero, while, in another embodiment, the initial value is set to the last known value for the counter 302A-302N. In some embodiments, the initial value is set to a historical or statistical value associated with the counter 302A-302N. In another embodiment, the value of the counter 302A-302N is not initialized and remains set to its current value. In further embodiments, the counter monitor 305 initializes the identified counter 302A-302N by communicating any type and/or form of reset or initialize instruction, directive, or command to the counter 302A-302N, such as by any suitable interface mechanism. In some embodiments, the counter 302A-302N initializes the value of the counter 302A-302N to a predetermined, preconfigured or programmed default or initial value. In other embodiments, the counter monitor 305 initializes the counter 302A-302N to an initial value determined and communicated by the counter monitor 305.

At illustrative step 408, the first timestamp is recorded. In some embodiments, the timestamp is recorded either as a relative or an absolute time value. For an absolute case, the timestamp may represent the actual reading of the timer 312 at the start of recording. In a relative case, the initial or first timestamp may be set to a value of zero or another default value. In another embodiment, the initial or first timestamp may be recorded as a delta timestamp value of the timestamp counter from the start of recording. For example, the counter monitor 305 may be configured to start the recording at a time of midnight and the first timestamp may be set to 0 indicating that the first reading occurred at midnight. In another example, the counter monitor 305 may be configured to start the recording at a time of midnight and the first timestamp may be set to 1 to indicate the first reading occurred 1 second after midnight.

At step 410 of illustrative method 400, a reading of the value of the counter 302A-302N is obtained at the first timestamp and recorded. The counter monitor 305 may read or obtain the value of the counter 302A-302N via network packets received at the network interface 304 or by requesting the value of the counter 302A-302N via any suitable interface mechanism. In some embodiments, the first time a value of a counter 302A-302B is obtained, the following three attributes are stored in a storage 309, 311: the value, the assigned counter designator, and the timestamp. As such, the counter log 315 for a particular counter 302A-302N comprises the first timestamp and first read value of the counter 302a-302N. In further embodiments, there may also be additional values stored in the event that there are multiple values for the counter 302A-302N or additional information desired to be logged, such as an IP address or user associated with the counter 302A-302N. In one embodiment, the actual value of the counter 302A-302N may be stored, and in another embodiment, the delta or differential value of the counter 302A-302N in comparison to the initial or default value me stored to the storage 309, 311.

Steps 412 through steps 422 of the illustrative method 400 are performed and repeated at subsequent timestamps to provide a counter log 315 using the skip and differential recording techniques of the present invention. At step 412, the next time interval or timestamp is recorded. In one embodiment, the next timestamp is recorded as a delta or differential value from the previous timestamp. In other embodiments, the next timestamp may be recorded as its actual value. In some embodiments, the next timestamp is recorded as a delta or differential value if the timestamp falls within the same day or date of the previous timestamp, such as the initial timestamp. In further embodiments, the next timestamp is recorded as its actual value when it marks or indicates a change in the day or date if the time period of the counter log 315 rolls over a day or date.

At step 414, the value of the counter 302A-302N at the next timestamp is obtained by the counter monitor 305. For example, the counter monitor 305 obtains the value of the counter 302A-302N via a network packet received via the network interface 304. At step 415, the current value of the counter 302A-302N is compared to the value of the counter 302A-302N recorded at the previous timestamp. Any type of difference or comparison algorithm may be used by the comparator 307 to compare the values based on the type and/or form of values. If the comparator 307 detects, identifies or indicates a change in the value at step 418, then at illustrative step 420, the difference or delta in the value between the current reading and the last stored reading of the counter 302A-302N is stored in association with the next timestamp recorded at step 412. In some embodiments, the counter designator is also stored each time with the next timestamp, and, in other cases, the counter designator is stored once and the next timestamp and/or value of the counter 302A-302N, delta or otherwise, is associated with the counter designator.

The delta value, also referred to as a differential value, may comprise any type and/or form of representation or expression to indicate a difference or change in value of a counter 302A-302N between one or more timestamps. In cases of numerical values, the delta value may comprise any type and form of arithmetic operation in which the difference between two numbers is calculated. In some embodiments, if the value of the counter 302A-302N is a relatively large number that changes frequently by small increments, the delta value of the counter 302A-302N stored at a timestamp may be much smaller to represent and store in storage 309,311 than the actual value of the counter 302A-302N at the timestamps. For example, a counter 302A-302N starting with an initial value of 1,000,000 at the first timestamp, may increment by 1 or 2 every subsequent timestamp, e.g., 1,000,001, and 1,000,002. Instead of the counter monitor 305 storing the values of 1,000,001 and 1,000,002 at subsequent timestamps, the counter monitor 305 stores the differential or delta values of 1 and 2. In other cases of alphanumeric or letter based values of counters 302A-302N, the delta or differential value may comprise any type and form of string difference or delta comparison algorithm. In some embodiments, the delta value comprises any type and form of delta encoding algorithm.

In one embodiment, the delta value comprises a difference between the value of the counter 302A-302N at the current timestamps and the value of the counter 302A-302N at the previous or last stored timestamp. In another embodiment, the delta value comprises a difference between the value of the counter 302A-302N at the current timestamp and a base value for the counter 302A-302N, such as the initial counter value 302A-302N at described above in illustrative step 406 of method 400. In some embodiments, the delta value may comprise a cumulative difference between the value of the counter 302A-302N at the current timestamp and a value of the counter 302A-302N at any previous timestamp. One ordinarily skilled in the art will recognize and appreciate the delta value may comprise any difference between the values of the counter 302A-302N between any of the timestamps, current or otherwise, in a cumulative, sequential or other manner.

In some embodiments, at illustrative step 420, the counter monitor 305 does not store the delta value but instead stores the actual value of the counter 302A-302N. In yet other embodiments, the counter monitor 305 may store the actual value of the counter 302A-302N on a frequency of every certain number of timestamps, for example, on every $10^{th}$ timestamp reading. In other cases, the counter monitor 305 may store the actual value of the counter 302A-302N instead of the delta value every time the timestamp crosses a day or date boundary, such at or near midnight. Those ordinarily skilled in the art will recognize and appreciate that the present invention may at times write the actual value of the counter instead of the delta value and still reduce the storage resources used for a counter log.

The timestamp and counter values, deltas or otherwise, may be stored in association with the counter 302A-302N in storage 309, 311 by any suitable association scheme. In one embodiment, the counter designator is used as a record or database key to identify the one or more records of the counter log 315 associated with a counter 302A-302N. In another embodiment, the timestamps and counter values are stored in a data structure providing a linked list of information from one timestamp to the next timestamp for a counter 302A-302N. In some embodiments, the timestamps and counter values are stored in a character delimited list or string in a storage location associated with the counter 302A-302N. For example, the first character or set of characters in the list or string may comprise the counter designator. In further embodiments, the storage location of the counter log 315 may comprise a continuous block of storage associated with the counter 302A-302N. Those ordinarily skilled in the art will recognize and appreciate the various ways a counter log 315 may be formed in storage 309, 311 by associating timestamps and counter values, delta or otherwise, with a counter 302A-302N.

If at step 418, the comparator 307 detects, identifies or indicates the current value of the counter 302A-302N has not changed from the previous counter value, then illustrative method 400 continues to step 422. That is, the counter monitor 305 records the timestamp at step 412 but does not record, or otherwise skips recording, the unchanged value of the counter 302A-302N at step 420. At illustrative step 422, the counter monitor 305 determines if the time period for monitoring and recording a counter log 315 for the counters 302A-302N has expired or otherwise should be completed or terminated. The time period for monitoring and recording may be determined and/or configured by any suitable means and/or mechanisms. For example, the counter monitor 305 may have a user interface, graphical or otherwise, for a user to specify the length of the time period. In some embodiments, the monitoring and recording may terminate, automatically or otherwise, upon detection of an identified event, such as a counter 302A-302N having a specified value, or if the value of a counter 302A-302N has not changed over a predetermined number of timestamps.

If the monitoring and recording of counters 302A-302N should continue, then the illustrative method 500 continues to step 412 to repeat steps 412 through 422 for the next timestamp. As such, the recording and monitoring of counters 302A-302N may continue for the desired time period over at equal or variable timer intervals values of the counters 302A-302N are compared and either storing of the value is skilled, i.e., skip recording technique, or only the differential or delta value is stored, i.e., differential recording technique. Otherwise, the monitoring and recording of counters 302A-302N terminates or ends at step 424. In some embodiments, the monitoring and recording of one counter 302A may execute at different rates or frequencies and terminate at a different time period than the monitoring and recording of another counter 302B. As such, steps 412 through 422 for one counter 302A may be repeated at a different rate or frequency than steps 412 through 422 for another counter 302B. One ordinarily skilled in the art will recognize and appreciate how the illustrative method 400 of the present invention may be executed nearly simultaneously or concurrently in some cases and subsequently in other cases for different counters at different timestamps intervals over different time periods.

Figure 5:
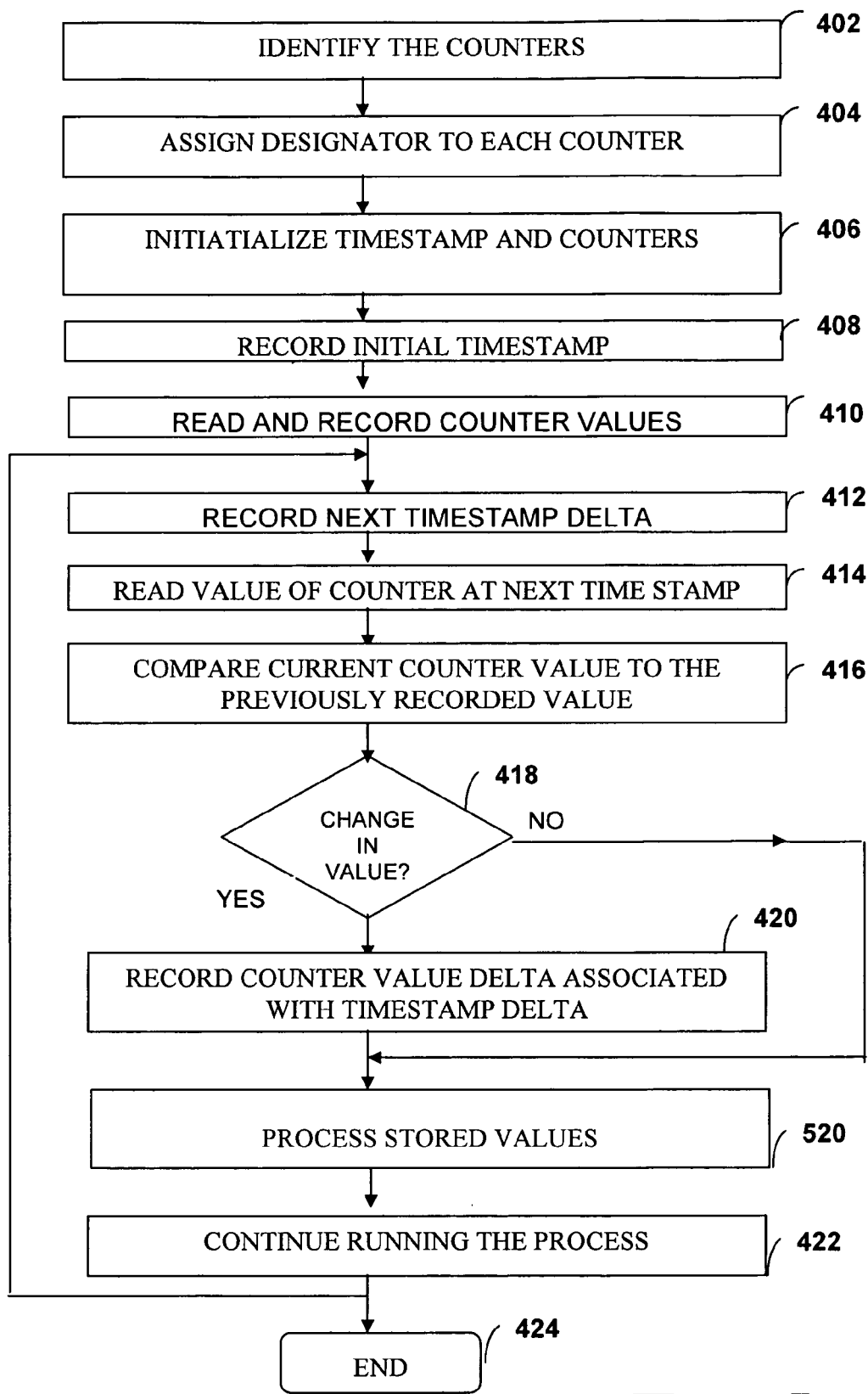
FIG. 5 depicts steps taken in one embodiment of a method for processing values from counters recorded using skip and differential recording techniques.

Referring now to FIG. 5, another embodiment of the techniques of the present invention is illustrated. Illustrative method 500 includes the additional step 520 wherein the stored values of the counters 302A-302N are further processed, for example, by the counter processor 401. As described above in connection with illustrative method 400 and FIG. 4, the values of the counters are compared against the previously recorded values at step 416, and if there is a change in the value, the delta or change value is recorded in association with the timestamp. Subsequently at step 520 the stored values are processed using one or more of a variety of algorithms. Hence, in comparison with the illustrative embodiment of FIG. 4, the embodiment illustrated in FIG. 5 includes the additional step of processing the values of the counters 302A-302B.

In further detail of illustrative step 520 of method 500 of the present invention, the counter monitor 305 may process the values, delta or otherwise, of the counters 302A-302N in any desired manner. In some embodiments, the counter processor 401 of the counter monitor 305 moves or transfers portions of the counter log 315 from the temporary storage 309 to permanent storage 311 at a certain frequency, such as every nth reading, or upon an event, such as the termination of monitoring at illustrative step 424. In one embodiment, the counter processor 401 reads the stored values of the counter 302A-302N from storage 309, 311, processes the values, and stores the processed values in association with the counter 302A-302N in the storage 309, 312. In some cases, the processed values are stored to replace the originally stored values, while in other cases, the processed value are stored in addition to the originally stored values. As discussed above in connection with the description of the counter processor 401 illustrated in FIG. 3, the counter processor 401 may perform any one or more the following types and forms of operations, functions or algorithms on the values of the counters 302A-302N: 1) compression, 2) encryption, 3) delta encoding, 4) hashing, 5) translation, 6) conversion, 7) transformation, 8) aggregation, 9) metric and 10) statistical calculations. In some embodiments, the counter processor 401 performs any of these operations, functions or algorithms prior to storing the values of the counter 302A-302N to storage 309, 311, such as at the illustrative steps 410 and 414 of method 400.

In some embodiments, the counter monitor 305 and/or counter processor 401, at illustrative step 520 of method 500, performs any processing of the skipped and/or differential recorded values of the counters 302A-302N to form or provide a counter log 315 showing the actual values of the counters 302A-302N at the timestamps at which the value was not recorded because it did not change or the delta value was recorded instead of the actual value. For example, the counter monitor 305 and/or counter processor 401 may obtain a counter log 315 from temporary storage 309, translate the skipped and/or differential recorded values of counters 302A-302N to corresponding actual values, and store a full counter log 315 in permanent storage 311. In other embodiments, the counter monitor 305 and/or counter processor 401 may process the values of the counters 302A-302N in a counter log 315 into a form desired by or to interface with any suitable network monitoring application or device.

Furthermore, the present invention may be practiced with any roll-over logging techniques known to those skilled in the art to manage and/or further reduce the storage resources required for logging. For example, the counter monitor 205 may start writing over storage locations at or near the start of the counter log 315 upon reaching a maximum size limit, e.g., a size of 1 MB, for a counter log 315, or after reaching a completion of a certain time period, for example, at the end of a day or 24 hour time period. In another aspect, by using the skip and differential recording techniques of the present invention, the counter log 315 can store monitored network parameters covering a longer time period and/or at more granular time stamps for the same or less storage usage. As such, in some embodiments, the techniques of the present invention may decrease the frequency or use of roll-over logging.

In view of the structure, function and operations of the counter monitor of the present invention described above, the counter monitor may be used in a variety of network monitoring situations and examples to reduce storage requirements for network monitoring or performance logging while providing comprehensive or lossless logging of network related data. The following example illustrates the application of the present invention for monitoring Transmission Control Protocol (TCP) input bytes. A Transmission Control Protocol (TCP) input bytes counter in a network device measures flows of TCP through a network interface. Consider an example, wherein multiple TCP input bytes counters are monitored. A different number may be assigned to designate each counter being monitored. Each counter's value is checked on a scheduled basis to determine if there is a change in the value of the counter. If the value in the counter has changed, i.e., if the counter has logged the flow of TCP input bytes since the last time stamp, then the change in value, of the counter is recorded. If there has been no change in the number of TCP input bytes recorded at the counter at the current time stamp compared to the time stamps in the previous reading, then only the time stamp itself is recorded and no new recording is conducted for TCP input bytes. As such, the present invention provides a comprehensive or lossless log of the TCP input byte counters over a time period while reducing the storage resource requirements by skipping recordings or storing only differential values.

In an another illustrative embodiment, the present invention enables network administrators and service providers that need to monitor data traffic in links in their network to determine if customers are using their network within contractual limits to do so in an effective and efficient manner. One or more network parameters can be monitored including the number of bytes transmitted, number of frames transmitted, number of collisions, error rates, magnitude of traffic delay, number of packets dropped, frequency of occurrence of a particular protocol and application level statistics. With a network administrator or service provider possibly monitoring many counters associated with many customers or network devices, the storage requirements for counters log correspondingly are increased. The present invention reduces the storage requirements for counter logs for the network administrator or service provider while providing a comprehensive view of network performance and behavior across the network for multiple customers or network devices.

The counter monitor of the present invention can also be used to monitor parameter or counters that include non-sequential or other arbitrarily ordered information. In some embodiments of the present invention, a counter could be monitored for data such as MAC addresses, source or destination addresses or other data in the packet headers that does not increment or decrement sequentially. The illustrative techniques of the present invention work in the same way with non-sequential counters as it does with sequential counters. For example, a counter that records MAC addresses simply notes each change in MAC addresses registered in the counter by recording the change in value in the MAC address stored even though the increment or decrement is arbitrary. The present invention measures changes in a counter's value relative to a previous value. Therefore in the example of recording MAC addresses, the present invention would record the change in value from the previous stored value by subtracting the old MAC address from the new MAC address without regard to the fact that such change in value is arbitrary. Starting with the initial MAC address value recorded for the counter, the present invention therefore tracks MAC address changes through each of the values as additions or subtractions.

Many alterations and modifications may be made by those having ordinary skill in the art without departing from the spirit and scope of the invention. Therefore, it must be expressly understood that the illustrated embodiments have been shown only for the purposes of example and should not be taken as limiting the invention, which is defined by the following claims. These claims are to be read as including what they set forth literally and also those equivalent elements which are insubstantially different, even though not identical in other respects to what is shown and described in the above illustrations.

We claim:

1. A method of monitoring network traffic, the method comprising the steps of:
   (a) obtaining, by a counter monitor at a first timestamp of a timer of the counter monitor, a first reading of a value of a counter representing information related to network traffic;
   (b) storing, by the counter monitor, the value of the first reading in association with the first timestamp of the timer to a storage unit providing a record of counter values over a time period;
   (c) obtaining, by the counter monitor, at a second timestamp of the timer subsequent to the first timestamp, a second reading of the value of the counter;
   (d) comparing the value of the counter at the second reading to the value of the counter at the first reading; and
   (e) if the value of the counter is unchanged, storing the second timestamp of the timer to the storage unit without storing the value of the counter at the second reading, such that the stored second timestamp has no corresponding counter value in the record of counter values over the time period.

2. The method of claim 1, comprising storing the second timestamp of the timer and a second value representing a difference between the second reading and the first reading to the storage unit if the value of the counter has changed.

3. The method of claim 1, comprising storing the second timestamp of the timer as a value representing a difference in time between the first timestamp and the second timestamp.

4. The method of claim 1, providing one of the first timestamp or the second timestamp via a second counter comprising a timer.

5. The method of claim 1, comprising identifying, by a user, the counter in the network desired to be monitored.

6. The method of claim 1, wherein the value of the counter comprises one of a single value or multiple values.

7. The method of claim 1, comprising assigning a unique numeric identifier to the counter.

8. The method of claim 1, wherein the value of the counter represents one or more of the following parameters: a bit rate, a MAC address, a source address, a destination address, a number of frames transmitted, a number of collisions, traffic delay data, data on packets dropped, data on frames per second, a frequency of occurrence of a particular protocol, an application level statistic and a metric used for network monitoring.

9. The method of claim 1, comprising executing the counter monitor in one of a bridge, a router, a switch, a load-balancer, a server, or a network interface card.

10. The method of claim 1, comprising setting a time interval between the first timestamp and the second timestamp of the timer at one of an equal or a variable time interval.

11. The method of claim 10, comprising setting the time interval based on one or more characteristics of the network traffic.

12. The method of claim 10, comprising setting the time interval to a rate of packet queuing in the network.

13. The method of claim 1, comprising processing a stored value of the counter in the storage unit, and storing the processed value in the storage unit in association with the counter.

14. The method of claim 1, further comprising the steps of:
 (f) reading, by a counter processor, the record of counter values over the time period stored to the storage unit;
 (g) identifying, by the counter processor, that the second timestamp is stored in the record without a corresponding value of the counter at the second reading;
 (h) determining, by the counter processor and responsive to the identification, that the value of the counter did not change from the time of the first timestamp to the time of the second timestamp of the timer.

15. An apparatus for recording values of monitored counters, the apparatus comprising:
 a storage for storing a record of values over a time period for a counter representing information related to network traffic;
 a timer;
 a counter monitor for monitoring a value of the counter, the counter monitor obtaining at a first timestamp of the timer a first reading of the value of the counter, and at a second timestamp of the timer subsequent to the first timestamp, a second reading of the value of the counter;
 the counter monitor storing the value of the first reading in association with the first timestamp to the storage;
 a comparator for comparing the first reading of the value of the counter to the second reading of the value of the counter, and if the value of the counter is unchanged, storing by the counter monitor the second timestamp of the timer to the storage unit without storing the value of the counter at the second reading, such that the stored second timestamp has no corresponding counter value in the record of counter values over the time period.

16. The apparatus of claim 15, wherein the counter monitor stores the second timestamp of the timer and a second value representing a difference between the second reading and the first reading to the storage if the value of the counter has changed.

17. The apparatus of claim 15, comprising a controller for coordinating a timing sequence of timestamps and recording of the values.

18. The apparatus of claim 17, comprising a read only memory for storing one or more algorithms executed by the controller.

19. The apparatus of claim 15, wherein the network comprises one of the following: a point to point network, a broadcast network, a wide area network, a local area network, a telecommunications network, a data communication network, a computer network, an ATM network, a SONET network, a SDH network, a wireless network and a wireline network.

20. The apparatus of claim 15, wherein the apparatus is located in one or more of the following locations in the network: a load balancer, a bridge, a router, a switch, a server, or a network interface card.

21. The apparatus of claim 15, wherein the storage resides external to the apparatus and in one of a same or different network as the apparatus.

22. The apparatus of claim 15, wherein the counter monitor comprises a multiplexer, wherein the multiplexer multiplexes the values from multiple counters and sends aggregated values to the comparator.

23. The apparatus of claim 15, wherein the counter comprises one of a sequential counter or a non-sequential counter.

24. The apparatus of claim 15, wherein the timer provided a time interval between the first timestamp and the second timestamp of the timer at one of an equal or a variable time interval.

25. The apparatus of claim 24, wherein the time interval is set based on one or more characteristics of the network traffic.

26. The apparatus of claim 15, wherein the time interval is set to a rate of packet queuing in the network.

27. The apparatus of claim 15, wherein the counter monitor stores the second timestamp of the timer as a value representing a difference in time between the first timestamp and the second timestamp.

28. The apparatus of claim 15, wherein the value of the counter comprises one of a single value or multiple values.

29. The apparatus of claim 15, wherein the counter monitor assigns a unique numeric identifier to the counter.

30. The apparatus of claim 15, wherein the value of the counter represents one or more of the following parameters: a bit rate, a MAC address, a source address, a destination address, a number of frames transmitted, a number of collisions, traffic delay data, data on packets dropped, data on frames per second, a frequency of occurrence of a particular protocol, an application level statistic and a metric used for network monitoring.

31. The apparatus of claim 15, comprising a processing circuit for processing a stored value of the counter in the storage unit.

32. The method of claim 1, comprising generating the first timestamp on an initial value of the timer, and generating the second timestamp on the next incremented value of the timer.

33. A method of monitoring network traffic, the method comprising the steps of:
 (a) obtaining, by a counter monitor at a first timestamp of a timer of the counter monitor, a first reading of a value of a counter representing information related to network traffic;
 (b) storing to a storage unit, by the counter monitor, the value of the first reading with the first timestamp of the timer to a list of entries, the list of entries providing a record of timestamps of the timer and corresponding counter values over a time period;
 (c) obtaining, by the counter monitor, at a subsequent timestamp of the timer, a second reading of the value of the counter;
 (d) comparing the value of the counter at the second reading to the value of the counter at the first reading; and
 (e) if the value of the counter is unchanged, storing the subsequent timestamp of the timer to the list of entries without storing the value of the counter at the second reading, such that the subsequent timestamp in the list of entries has no corresponding counter value in the list of entries.

* * * * *